United States Patent [19] | [11] 4,093,199
Hefner | [45] June 6, 1978

[54] ROTATABLE ENGINE SUPPORTING APPARATUS

[75] Inventor: Paul Hefner, Billings, Mont.

[73] Assignee: Ralph Stewart, Billings, Mont. ; a part interest

[21] Appl. No.: 821,225

[22] Filed: Aug. 2, 1977

[51] Int. Cl.[2] ............ B23Q 3/18
[52] U.S. Cl. ............ 269/61
[58] Field of Search ............ 269/55, 58, 61

[56] References Cited

U.S. PATENT DOCUMENTS

| | | | |
|---|---|---|---|
| 2,227,688 | 1/1941 | Wood | 269/61 |
| 2,311,668 | 2/1943 | Kennedy | 269/61 |
| 3,930,643 | 1/1976 | Moore | 269/58 |

*Primary Examiner*—Robert C. Watson
*Attorney, Agent, or Firm*—Arthur L. Urban

[57] ABSTRACT

A rotatable engine supporting apparatus including a pair of spaced truncated bases, an engine supporting frame disposed between the spaced base on rotatable shafts extending through pairs of bearing assemblies mounted on the upper surface of each of the bases, one of the shafts being driven by a gear reduction motor located in one of the bases through a chain and sprocket arrangement; the engine supporting frame being of a generally rectangular configuration with shorter end members affixed to the shafts and longer side members extending between the end members, the side and end members being edge-reinforced I beams welded together at the corners with overlay corner plate reinforcements, the frame having removable engine mounting brackets extending inwardly from each of the side members, each of the mounting brackets having an angle section with two faces engageable with the side member, a plurality of spaced connecting sections extending transversely from the angle section to an engine engaging section, the angle section and the engine engaging section having a plurality of openings along their lengths.

10 Claims, 7 Drawing Figures

FIG. 1
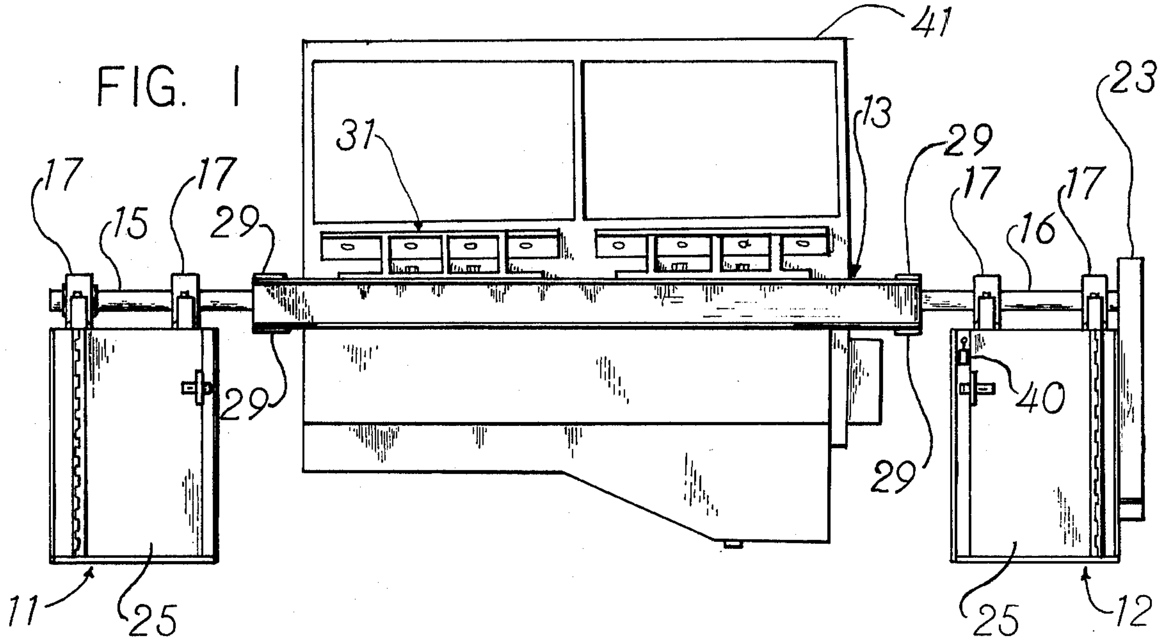
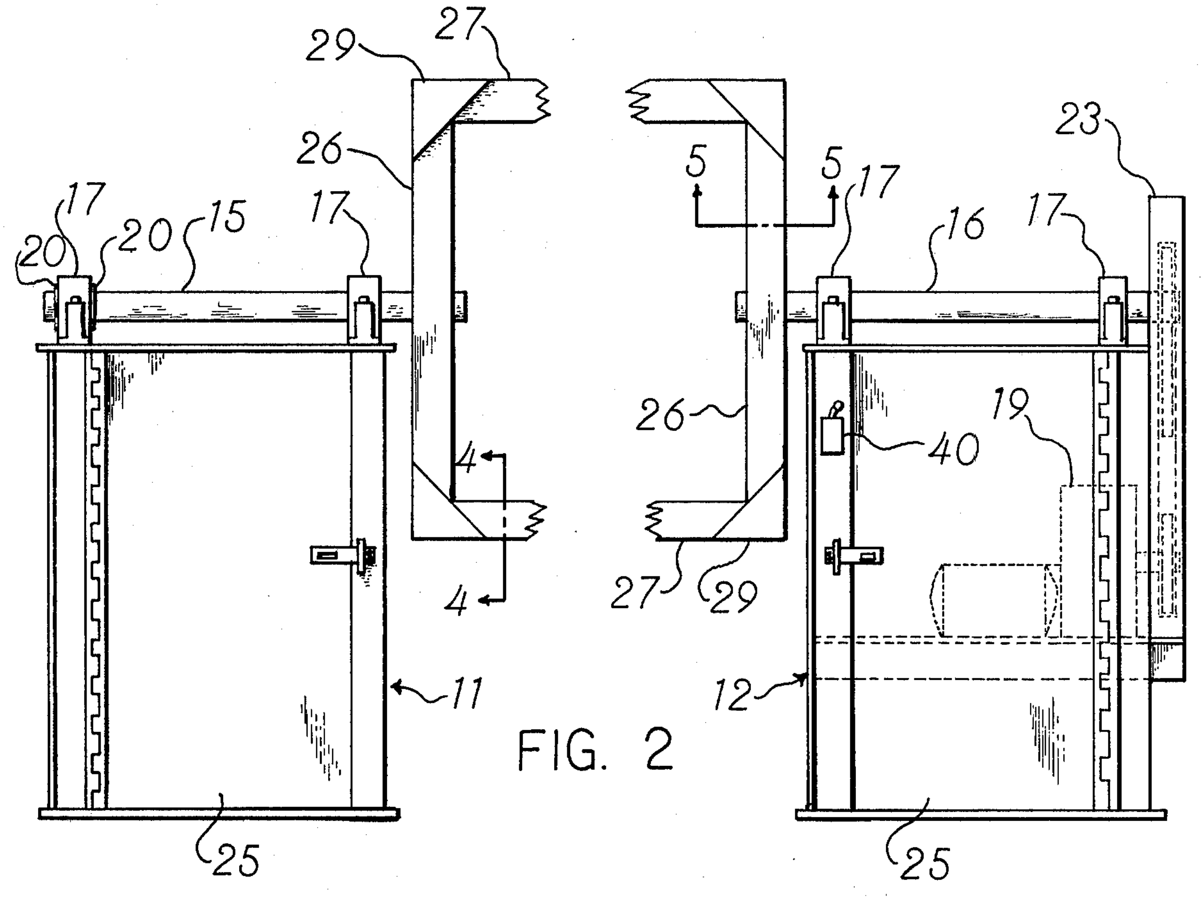
FIG. 2

FIG. 3
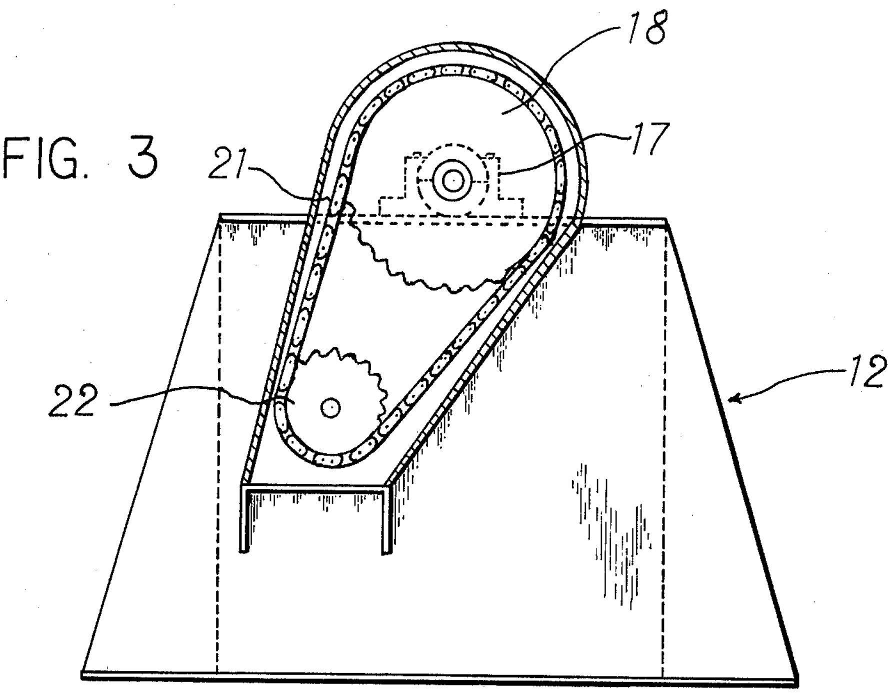
FIG. 4
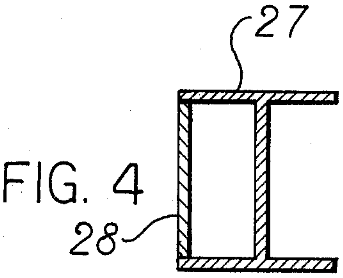
FIG. 5
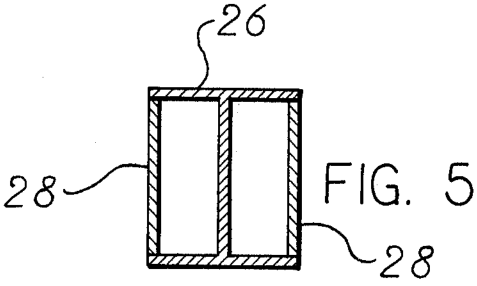
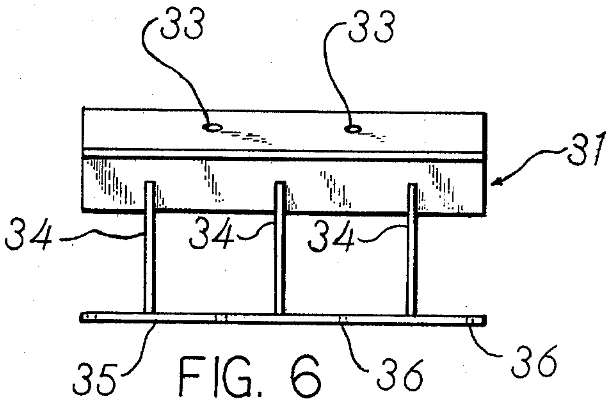
FIG. 6
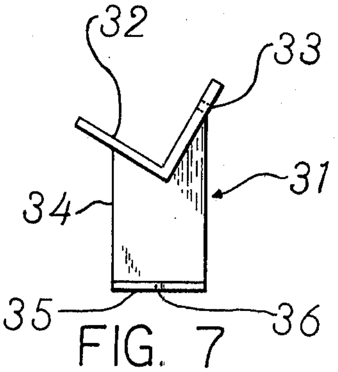
FIG. 7

ROTATABLE ENGINE SUPPORTING APPARATUS

This invention relates to a novel apparatus for supporting an engine and more particularly relates to an apparatus capable of supporting and rotating an engine of great weight and size.

A variety of stands have been proposed in the past as supports for engines during servicing and repair thereof. Note U.S. Pat. Nos. 1,236,246; 1,468,397; 1,792,612; 2,741,830; 2,825,477; and 2,931,644. The above patents are concerned with stands for relatively light engines. With such lighter engines, the designing of a stand is relatively straight forward. The engine can be supported at each end or on one side and can be rotated by peripheral rings or other means. While such designs are satisfactory for light weight engines, they are not suitable for heavier engines weighing three tons or more, even when the various components are enlarged and/or strengthened.

U.S. Pat. No. 3,930,643 to Moore proposes an apparatus capable of handling engines of five tons or more. The apparatus of this patent includes a system for adjusting the center of gravity of the engine closer to the axis of rotation. The system utilizes a complicated arrangement of means to sense out of balance forces and the attitude of the engine and then provide an output signal to adjusting means to change the position of the engine. A major disadvantage of such an apparatus is its complexity and cost of the extra system for repositioning the engine. Thus, the apparatus described in the patent is not considered to be the best solution to the problem of handling heavy engines during servicing and repair.

The present invention provides a novel apparatus for handling heavy engines which is simple in design and convenient to use. Furthermore, an engine can be loaded and secured to the apparatus easily. Also, the apparatus of the invention permits rotation of the engine for access to the various parts of the engine even though the engine is large in size and weighs several tons. Moreover, the apparatus of the invention can accommodate engines of varying size and shape. In addition, the apparatus requires very little maintenance. Also, the apparatus can be taken apart easily for shipping or moving, and the apparatus can be assembled without special skills. Further, the apparatus of the invention can be manufactured from commercially available materials.

Other benefits and advantages of the present invention will be apparent from the following description and the accompanying drawings in which:

FIG. 1 is a side elevation of an engine supporting apparatus of the present invention;

FIG. 2 is an enlarged broken side elevation of the engine supporting apparatus shown in FIG. 1;

FIG. 3 is a right end view of the engine supporting apparatus shown in FIG. 1;

FIG. 4 is a sectional view taken along line 4 — 4 of FIG. 2;

FIG. 5 is a sectional view taken along line 5 — 5 of of FIG. 2;

FIG. 6 is a side elevation of an engine mounting bracket of the apparatus shown in FIG. 1; and FIG. 7 is an end view of the engine mounting bracket shown in FIG. 6.

As shown in the drawings, one form of the novel engine supporting apparatus of the present invention comprises a pair of truncated bases 11 and 12 which are spaced from each other. An engine supporting frame 13 is disposed between bases 11 and 12 on rotatable shafts 15 and 16 which extend from frame 13. Each shaft 15 and 16 extends through a pair of bearing assemblies shown as split pillow blocks 17. Shaft 15 has retaining rings 20 on both sides of the outside pillow block 17 adjacent to the end of the shaft.

Shaft 16 has a sprocket 18 preferably a taper lock sprocket affixed to the end thereof. Sprocket 18 is operatively connected to a gear reduction motor 19 through a chain 21 and a sprocket 22 on the output shaft of the gear reduction motor 19. Advantageously, chain 21 is a double strand chain and sprocket 22 is a taper lock sprocket. Gear reduction motor 19 which is located in base 12 preferably has a double reduction. A protective cover 23 is positioned over sprockets 18 and 22 and chain 21 for safety.

The truncated bases 11 and 12 on which pillow blocks 17 are mounted advantageously are enclosed and have access doors 25. This arrangement provides lockable security for gear reduction motor 19 located in base 12 and for any tools or supplies (not shown) in base 11.

Engine supporting frame 13 which is rotatably supported between bases 11 and 12 is of a generally rectangular configuration with shorter end members 26 and longer side members 27. End members 26 and side members 27 are edge reinforced I beams as shown in detail in FIGS. 4 and 5. Preferably, end and side members 26 and 27 have plates 28 welded between their edges along their entire lengths. Advantageously, end members 26 have plates welded along both open sides of the I beams for greater strength and to facilitate securing of the shafts 15 and 16 thereto. Members 26 and 27 are welded together at the corners to form frame 13 with corner plate reinforcements 29 preferably overlaying both sides of each corner.

Frame 13 has removable engine mounting brackets 31 attached to each of the side members 27. The brackets 31 secured to one side member 27 extend inwardly toward the brackets attached to the opposite side member. Advantageously, the brackets 31 are bolted to the side members 27 so the position of the brackets can be changed and/or so the brackets can be replaced with different brackets to support particular engine configurations. Preferably, the brackets 31 extend along substantially the entire length of both sides of the engine.

As shown in FIGS. 6 and 7, each engine mounting bracket 31 has an angle section 32 with two faces forming a right angle with engages one of the side members 27. One or both faces of the angle section 32 have openings 33 for bolts to secure the angle section to the side member. Engine mounting bracket 31 also has a plurality of spaced connecting sections 34 which extend transversely from angle section 32 to an engine engaging section 35. Section 35 which contacts the engine has a plurality of openings 36 for bolts to secure section 35 to the engine.

The position or angle of section 35 with respect to connecting sections 34 as well as the orientation of the faces of angle section 32 with respect to connecting sections 34 in the mounting bracket will depend upon the configuration of the particular engine being serviced. Advantageously, the shape and size of the brackets 31 will be selected so the engine is supported on the frame 13 with its center of gravity close to the axis of rotation of the frame.

Although the engine supporting apparatus of the present invention must of necessity be of large size to accommodate heavy engines, it generally can be shipped in at least three smaller subassemblies — two bases 11 and 12 and frame 13 with shafts 15 and 16 and brackets 31 attached thereto. Upon arrival at the desired location, the bases 11 and 12 are aligned and bolted to the floor. Then, the frame 13 is placed on the bases with the shafts 15 and 16 resting on the bottom halves of split pillow blocks 17. The upper halves of the pillow blocks 17 are fastened to the lower halves to secure the shafts 15 and 16 in place. Thereafter, sprocket 18 is affixed to shaft 16 and chain 21 positioned over sprocket 18 and sprocket 22 on the output shaft of the gear reduction motor 19.

In the operation of the engine supporting apparatus of the present invention shown in the drawings, gear reduction motor 19 is activated by controls 40 to rotate frame 13 into a horizontal position. Then, engine mounting brackets 31 appropriate for the particular engine to be serviced are bolted into place on side members 27 of the frame. Thereafter, an engine 41 is moved with an overhead hoist or similar equipment to the engine supporting apparatus and lowered into position within the horizontally disposed frame 13. The position of the engine is adjusted so the openings 36 of brackets 31 will be aligned with threaded openings (not shown) in the engine. With some engines, the threaded engine openings may be bolt holes exposed by removing the manifolds from the engine. When the openings 36 are properly aligned, bolts are inserted through the openings and tightened to secure both sides of the engine to brackets 31 and frame 13. The engine is then freed from the hoist and the weight of the engine rests on frame 13.

The necessary repairs and/or service of the engine is performed with the engine being rotated as required by actuating controls 40 to activate gear reduction motor 19 and rotate shaft 16 and the engine on frame 13. When servicing is completed, the engine is returned to an upright position, the hoist refastened to the engine and the bolts removed from openings 36 of brackets 31. This releases the engine from frame 13 so the engine can be removed from the frame. Another engine can be positioned for servicing according to the above procedure with only a change in the mounting brackets 31 if the configuration of the engine requires it.

An engine supporting apparatus of the present invention suitable for engines of three to eight tons may have, for example, a frame approximately 6 feet × 13 feet formed of edge-reinforced 6 inches × 6 inches 20 # I beams. Shafts 15 and 16 may be 4 inches solid shafts, sprocket 18 a 19 inches 60T 80-2 taper lock sprocket, sprocket 22 a 6¼inches 20T 80-2 taper lock sprocket, chain 21 a 1 inch pitch double strand chain and gear reduction motor 19 a Morse 35 GCDB double reduction, gear reduction motor. Brackets 31 formed of ½ inch plate are about 27 inches long with three connecting sections 34 for each bracket and two brackets on each side member 27.

The above description and the accompanying drawings show that the present invention provides a novel apparatus for handling heavy engines. Moreover, the apparatus is simple in design, convenient to use and requires little maintenance. Also, the apparatus of the invention can accommodate engines of varying size and shape. Furthermore, the apparatus permits rotation of the engine for easy access even though the engine is large in size and weighs several tons. In addition, the apparatus can be manufactured from commercially available materials and can be divided into smaller subassemblies for shipping.

It will be apparent that various modifications can be made in the particular engine supporting apparatus described in detail above and shown in the drawings within the scope of the invention. Therefore, the invention is to be limited only by the following claims.

What is claimed is:

1. A rotatable engine supporting apparatus including a pair of spaced truncated bases, an engine supporting frame disposed between the spaced bases on rotatable shafts extending through pairs of bearing assemblies mounted on the upper surface of each of said bases, one of said shafts being driven by a gear reduction motor located in one of said bases through a chain and sprocket arrangement; said engine supporting frame being of a generally rectangular configuration with shorter end members affixed to the shafts and longer side members extending between the end members, said side and end members being edge-reinforced I beams welded together at the corners with overlay corner plate reinforcememts, said frame having removable engine mounting brackets extending inwardly from each of said side members, each of said mounting brackets having an angle section with two faces engageable with said side member, a plurality of spaced connecting sections extending transversely from said angle section to an engine engaging section, said angle section and said engine engaging section having a plurality of openings along their lengths.

2. A rotatable engine supporting apparatus according to claim 1 wherein said bearing assemblies are pillow blocks.

3. A rotatable engine supporting apparatus according to claim 1 wherein said side and end members of said frame are I beams with plates welded between their edges along their entire lengths.

4. A rotatable engine supporting apparatus according to claim 3 wherein said end members have welded plates along both open sides of said I beams.

5. A rotatable engine supporting apparatus according to claim 1 wherein said frame has corner plate reinforcements on both sides of each corner.

6. A rotatable engine supporting apparatus according to claim 1 wherein said gear reduction motor is a double reduction gear motor.

7. A rotatable engine supporting apparatus according to claim 1 wherein said engine mounting brackets extend along substantially the entire length of both sides of an engine.

8. A rotatable engine supporting apparatus according to claim 1 wherein said sprockets are taper lock sprockets.

9. A rotatable engine supporting apparatus according to claim 1 wherein said chain is a double strand chain.

10. A rotatable engine supporting apparatus according to claim 1 wherein said non-driven shaft has retaining rings on both sides of the bearing assembly adjacent the end of said shaft.

* * * * *